US011254263B2

(12) United States Patent
Nix et al.

(10) Patent No.: US 11,254,263 B2
(45) Date of Patent: *Feb. 22, 2022

(54) VEHICULAR VISION SYSTEM

(71) Applicant: MAGNA ELECTRONICS INC., Auburn Hills, MI (US)

(72) Inventors: Axel Nix, Birmingham, MI (US); Yuesheng Lu, Farmington Hills, MI (US)

(73) Assignee: MAGNA ELECTRONICS INC., Auburn Hills, MI (US)

( * ) Notice: Subject to any disclaimer, the term of this patent is extended or adjusted under 35 U.S.C. 154(b) by 17 days.

This patent is subject to a terminal disclaimer.

(21) Appl. No.: 15/929,454

(22) Filed: May 4, 2020

(65) Prior Publication Data

US 2020/0262345 A1  Aug. 20, 2020

Related U.S. Application Data

(63) Continuation of application No. 16/435,802, filed on Jun. 10, 2019, now Pat. No. 10,640,044, which is a
(Continued)

(51) Int. Cl.
*B60Q 1/00* (2006.01)
*B60R 1/00* (2022.01)
(Continued)

(52) U.S. Cl.
CPC ............... *B60R 1/00* (2013.01); *B60R 1/002* (2013.01); *H04N 5/23216* (2013.01);
(Continued)

(58) Field of Classification Search
CPC .... G06K 9/0085; B60W 30/09; B60W 11/04; G08G 1/16; B60R 11/04
See application file for complete search history.

(56) References Cited

U.S. PATENT DOCUMENTS 4,037,250 A    7/1977 McGahan et al.
5,487,116 A    1/1996 Nakano et al.
(Continued)

FOREIGN PATENT DOCUMENTS

EP    1308346 A2    5/2003

OTHER PUBLICATIONS

"Switching Video Using Nalog Switches", Jun. 23, 2006, XP55111937, San Jose, CA, US. Retrieved from the Internet: URL: http://pdfserv.maxintegrated.com/en/an/AN3823.pdf.

*Primary Examiner* — Toan N Pham
(74) *Attorney, Agent, or Firm* — Honigman LLP

(57) ABSTRACT

A vehicular vision system includes a plurality of cameras mounted at the vehicle and having respective fields of view exterior of the vehicle. The cameras include a CMOS image sensor and a serial data interface configured for transmission of captured image data to an image processing system via a serial data bus linking the respective camera to the image processing system, which processes the transmitted captured image data. The vehicular vision system transmits data to the cameras via the respective serial data bus linking the respective camera to the image processing system. The vehicular vision system activates at least one camera of the plurality of cameras (i) responsive to a gear position of the vehicle, (ii) based on situational analysis information derived from the image processing system, or (iii) based on a driving condition.

25 Claims, 5 Drawing Sheets

Related U.S. Application Data continuation of application No. 15/911,454, filed on Mar. 5, 2018, now Pat. No. 10,315,572, which is a continuation of application No. 15/344,860, filed on Nov. 7, 2016, now Pat. No. 9,908,473, which is a continuation of application No. 14/605,154, filed on Jan. 26, 2015, now Pat. No. 9,487,141, which is a continuation of application No. 13/964,138, filed on Aug. 12, 2013, now Pat. No. 8,941,480, which is a continuation of application No. 12/992,301, filed as application No. PCT/US2009/044111 on May 15, 2009, now Pat. No. 8,508,350.

(60) Provisional application No. 61/053,705, filed on May 16, 2008.

(51) Int. Cl.
  *H04N 5/268* (2006.01)
  *H04N 7/18* (2006.01)
  *H04N 5/232* (2006.01)
  *G06F 3/0482* (2013.01)

(52) U.S. Cl.
  CPC ......... *H04N 5/23293* (2013.01); *H04N 5/268* (2013.01); *H04N 7/181* (2013.01); *B60R 2300/105* (2013.01); *B60R 2300/207* (2013.01); *B60R 2300/806* (2013.01); *G06F 3/0482* (2013.01)

(56) References Cited

U.S. PATENT DOCUMENTS

| | | |
|---|---|---|
| 5,550,662 A | 8/1996 | Bos |
| 5,670,935 A | 9/1997 | Schofield et al. |
| 5,796,094 A | 8/1998 | Schofield et al. |
| 5,877,897 A | 3/1999 | Schofield et al. |
| 6,097,023 A | 8/2000 | Schofield et al. |
| 6,201,642 B1 | 3/2001 | Bos |
| 6,313,454 B1 | 11/2001 | Bos et al. |
| 6,320,176 B1 | 11/2001 | Schofield et al. |
| 6,353,392 B1 | 3/2002 | Schofield et al. |
| 6,396,397 B1 | 5/2002 | Bos et al. |
| 6,498,620 B2 | 12/2002 | Schofield et al. |
| 6,611,202 B2 | 8/2003 | Schofield et al. |
| 6,690,268 B2 | 2/2004 | Schofield et al. |
| 6,693,518 B2 | 2/2004 | Kumata et al. |
| 6,717,610 B1 | 4/2004 | Bos et al. |
| 6,757,109 B2 | 6/2004 | Bos |
| 6,989,736 B2 | 1/2006 | Berberich et al. |
| 7,005,974 B2 | 2/2006 | McMahon et al. |
| 7,050,089 B2 | 5/2006 | Nakamura |
| 7,463,281 B2 | 12/2008 | Luskin et al. |
| 7,511,607 B2 | 3/2009 | Hubbard et al. |
| 7,579,939 B2 | 8/2009 | Schofield et al. |
| 7,697,027 B2 | 4/2010 | McMahon et al. |
| 7,783,403 B2 | 8/2010 | Breed |
| 7,855,755 B2 | 12/2010 | Weller et al. |
| 7,965,336 B2 | 6/2011 | Bingle et al. |
| 8,054,384 B2 | 11/2011 | Yang et al. |
| 8,207,868 B2 | 6/2012 | Watanabe |
| 8,508,350 B2 | 8/2013 | Nix et al. |
| 8,941,480 B2 | 1/2015 | Nix et al. |
| 9,487,141 B2 | 11/2016 | Nix et al. |
| 9,908,473 B2 | 3/2018 | Nix et al. |
| 10,315,572 B2 | 6/2019 | Nix et al. |
| 10,640,044 B2 | 5/2020 | Nix et al. |
| 2003/0137586 A1 | 7/2003 | Lewellen |
| 2003/0222982 A1 | 12/2003 | Hamdan et al. |
| 2005/0093975 A1 | 5/2005 | Hamdan et al. |
| 2005/0174429 A1 | 8/2005 | Yanai |
| 2007/0153131 A1 | 7/2007 | Yang et al. |
| 2017/0060234 A1* | 3/2017 | Sung ................ G06F 3/1431 |
| 2021/0023992 A1* | 1/2021 | Broggi ............ G02B 27/0101 |

\* cited by examiner

VEHICULAR VISION SYSTEM

CROSS REFERENCE TO RELATED APPLICATIONS

The present application is a continuation of U.S. patent application Ser. No. 16/435,802, filed Jun. 10, 2019, now U.S. Pat. No. 10,640,044, which is a continuation of U.S. patent application Ser. No. 15/911,454, filed Mar. 5, 2018, now U.S. Pat. No. 10,315,572, which is a continuation of U.S. patent application Ser. No. 15/344,860, filed Nov. 7, 2016, now U.S. Pat. No. 9,908,473, which is a continuation of U.S. patent application Ser. No. 14/605,154, filed Jan. 26, 2015, now U.S. Pat. No. 9,487,141, which is a continuation of U.S. patent application Ser. No. 13/964,138, filed Aug. 12, 2013, now U.S. Pat. No. 8,941,480, which is a continuation of U.S. patent application Ser. No. 12/992,301, filed Nov. 12, 2010, now U.S. Pat. No. 8,508,350, which is a 371 national phase entry of PCT Application No. PCT/US2009/044111, filed May 15, 2009, which claims the filing benefits of U.S. provisional application Ser. No. 61/053,705, filed May 16, 2008.

TECHNICAL FIELD

The present invention generally relates to a vehicular system for displaying video input from a plurality of video sources, and more particularly, to an automotive camera system comprising two or more cameras sharing a common display.

BACKGROUND OF THE INVENTION

It is known to provide a rearward facing camera or imaging sensor or device at a rear of a vehicle and with a generally rearward and downward field of view to capture images of the area immediately rearward of the vehicle for a rear vision system or back up aid system or the like. Examples of such rear vision devices and systems are described in U.S. Pat. Nos. 7,005,974; 6,989,736; 6,757,109; 6,717,610; 6,396,397; 6,201,642; 6,353,392; 6,313,454; 5,550,677; 5,670,935; 5,796,094; 5,877,897; 6,097,023 and 6,498,620, and PCT Publication No. WO 2004/047421, which are all hereby incorporated herein by reference in their entireties.

For parking into parallel parking spots along a street it is also known to provide a camera mounted on the passenger side of the vehicle, facing generally rearward and to the side, thereby providing the driver a better view of the curb and other objects to the side of the vehicle.

To connect two or more video sources to the same display video switches are often used to toggle between the alternative video sources. An example of an in-vehicle video architecture using video switching is illustrated in U.S. Pat. No. 7,050,089, which is incorporated hereby by reference in its entirety. Video switches may be stand-alone control units or integrated with other control units, e.g., a display device.

While a video switch is useful to share one display between two or more cameras it adds significant cost. Therefore, it is desirable to share one display device between two or more cameras without the need for a video switch.

SUMMARY OF THE INVENTION

In one aspect, the invention is directed to a system for providing and displaying video information in a vehicle. The system includes a display device having a video input, a plurality of video sources each having a video output, wherein the video outputs from the video sources are connected in parallel to the video input of the display device, and a video source control device configured to keep no more than one video source activated at a time when the display is active.

In a particular embodiment, one or more of the video sources may be a camera. For example, one of the video sources may be a rear-mounted rearview camera on the vehicle. As another example, one of the video sources may be a camera mounted at the side of the vehicle to provide a view of a curb during parking of the vehicle.

The video source control device is configured to control the activation and deactivation of the video sources. The video source control device may further be configured to control the activation and deactivation of the display device. The video source control device may communicate with the video sources through a serial data bus that is suitable for vehicular use, to instruct the video sources to activate or deactivate as desired.

In another aspect, the invention is directed to a camera for a vehicle.

The camera includes an image sensor, a microcontroller and a serial data interface. The image sensor has an image sensor video output configured for transmitting a stream of video captured by the image sensor to a camera video output connector. The image sensor video output includes a video plus electrical conduit and a video minus electrical conduit. The microcontroller is operatively connected to the image sensor. The serial data interface permits the microcontroller to communicate with at least one other electronic control module in the vehicle. A resistor having a selected impedance connected in series with a switch are provided, wherein the resistor and switch connect the video plus electrical conduit and the video minus electrical conduit. The switch is openable by the microcontroller to deactivate the image sensor video output into a high impedance state and is closable to activate the image sensor video output. The microcontroller is configured to comply with a selected message received from another electronic control module in the vehicle through the serial data interface by opening the switch.

In yet another aspect, the invention is directed to a method for switching between a plurality of video sources in a vehicle, wherein the video sources are connected to a display device in parallel, including one activated video source and at least one deactivated video source, comprising: a) deactivating the activated video source; and b) activating one deactivated video source.

In yet another aspect, the invention is directed to a method for switching between a plurality of video sources in a vehicle, wherein the video sources are connected to a display device in parallel, including one activated video source and at least one deactivated video source, comprising: a) deactivating the display device; b) deactivating the activated video source; c) activating one deactivated video source after at least one of steps a) and b); and d) activating the video display device.

In yet another aspect, the invention is directed to a video selection system, including a plurality of video sources, each having a video output, a video selector switch configured to selectively provide a connection between any selected one of the video sources and a video input of a display device, a video source control device operatively connected to the video sources and to the video selector switch, such that the video source control device is configured to control which video source is connected to the display device, and is configured to permit no more than one video source to be active at any given time when the display device is active.

DETAILED DESCRIPTION OF THE INVENTION

Figure 6:
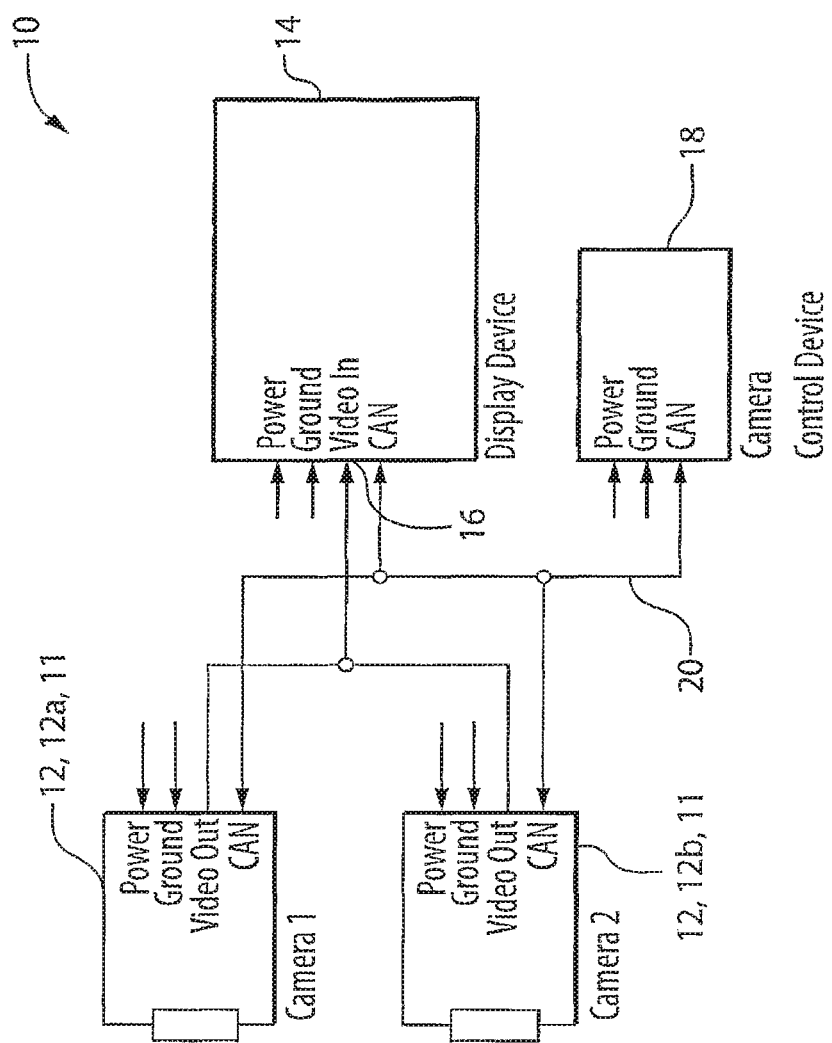
FIG. 6 is a block diagram showing an exemplary vehicle camera system with two cameras, a display device and a camera control device.

Reference is made to FIG. 6, which shows a schematic illustration of a system 10 for displaying video input from a plurality of video sources for use in a vehicle, in accordance with an embodiment of the present invention. The system 10 shown in FIG. 6 includes a plurality of video sources 11 which are connected in parallel to a common display device 14. The video sources 11 may each be any suitable source of video signals such as a camera (e.g., a rear-mounted rearview camera or a side-mounted rearview camera), a DVD player, a vehicular navigation system or a connection to an external, user-supplied, electronic device. In the embodiment shown in FIG. 6, two cameras 12, shown individually at 12a and 12b, make up the plurality of video sources. The first camera 12a may, for example, be mounted at the rear of a vehicle, and the second camera 12b may be mounted at the side of the vehicle.

The cameras 12 are wired in parallel to a common video input shown at 16 of the display device 14. The cameras 12 are configured such that their video output shown at 17 (and shown individually at 17a on the first camera 12a and at 17b on the second camera 12b) can be activated and deactivated in response to an instruction from a video source control device 18, which may be referred to as a camera control device 18 in the embodiment shown in FIG. 6 wherein all the video sources 11 are cameras 12. The video output 17 may be referred to as the camera video output.

The camera control device 18 communicates with the cameras 12 through a serial data bus 20. The camera control device 18 activates no more than one camera 12 at any given time and deactivates any other cameras 12 in the system 10. In this way, the central camera control device 18 acts as a central arbitration logic, controlling which camera 12 gets access to the display device 14 at any given time.

The central camera control device 18 may select which camera 12 is active based on interaction with a user. For example, a switch or reconfigurable menu may be provided in the vehicle cabin that is usable by the vehicle driver to select which camera 12 to activate. The central camera control device 18 may also automatically select which camera 12 to activate based on data received from other control units within the vehicle, such as control units that indicate gear position, steering angle, parking spot orientation information from a navigation system, or situational analysis information derived from an image processing system, a radar sensor system, an ultrasonic ranging system or a LIDAR sensor system.

Optionally, the display device 14 may be configured to prevent the appearance of undesirable artifacts when switching between two cameras 12. The switching the video to be displayed from one camera 12 to another camera 12 (e.g., from the first camera 12a to the second camera 12b) may be carried out using the following method: The camera control device 18 temporarily deactivates the display device 14. For example, the camera control device 18 may command the display device 14 to show a blank screen. While the display device 14 is deactivated any video data or video artifacts at its input are ignored and not visible to the user of the vehicle. Next, the camera control device 18 sends a first serial data message along serial data bus 20 to the first, presently active, camera 12a, instructing the first camera to deactivate its output. Responsive to the first serial data message the first camera deactivates its output 17a. The camera control device 18 also sends a second serial data message along the serial data bus 20 to the second, presently deactivated camera 12b. Responsive to the second serial data message the second camera 12b starts producing video. Lastly, the camera control device reactivates the display device 14 to show the video received at its video input 16.

The above-described method need not be executed in the precise order of steps described. For example, the camera control device 18 may send the instruction to deactivate to the first camera 12a before it deactivates the display device 14.

It will also be noted that, in embodiments wherein the display device 14 is deactivated as a first step, the activated camera need not be deactivated prior to the activation of a deactivated camera. This is because crosstalk between two activated cameras 12 is permissible when the display device 14 is deactivated. As a result, in embodiments wherein the display device 14 is deactivated as a first step, the camera control device 18 need not keep only one camera 12 active at any given time. Instead the camera control device 18 keeps only one camera 12 active at any given time when the display device 14 is activated.

The above-described method prevents the appearance of undesirable artifacts when switching between two cameras 12. It will be understood that the deactivation and subsequent activation of the display device 14 is optional and that it is possible to practice a method of switching between cameras 12 that are connected in parallel to a display device in a vehicle by: deactivating an active camera; and activating a deactivated camera, so that only one camera is activated at any given time.

Figure 1:
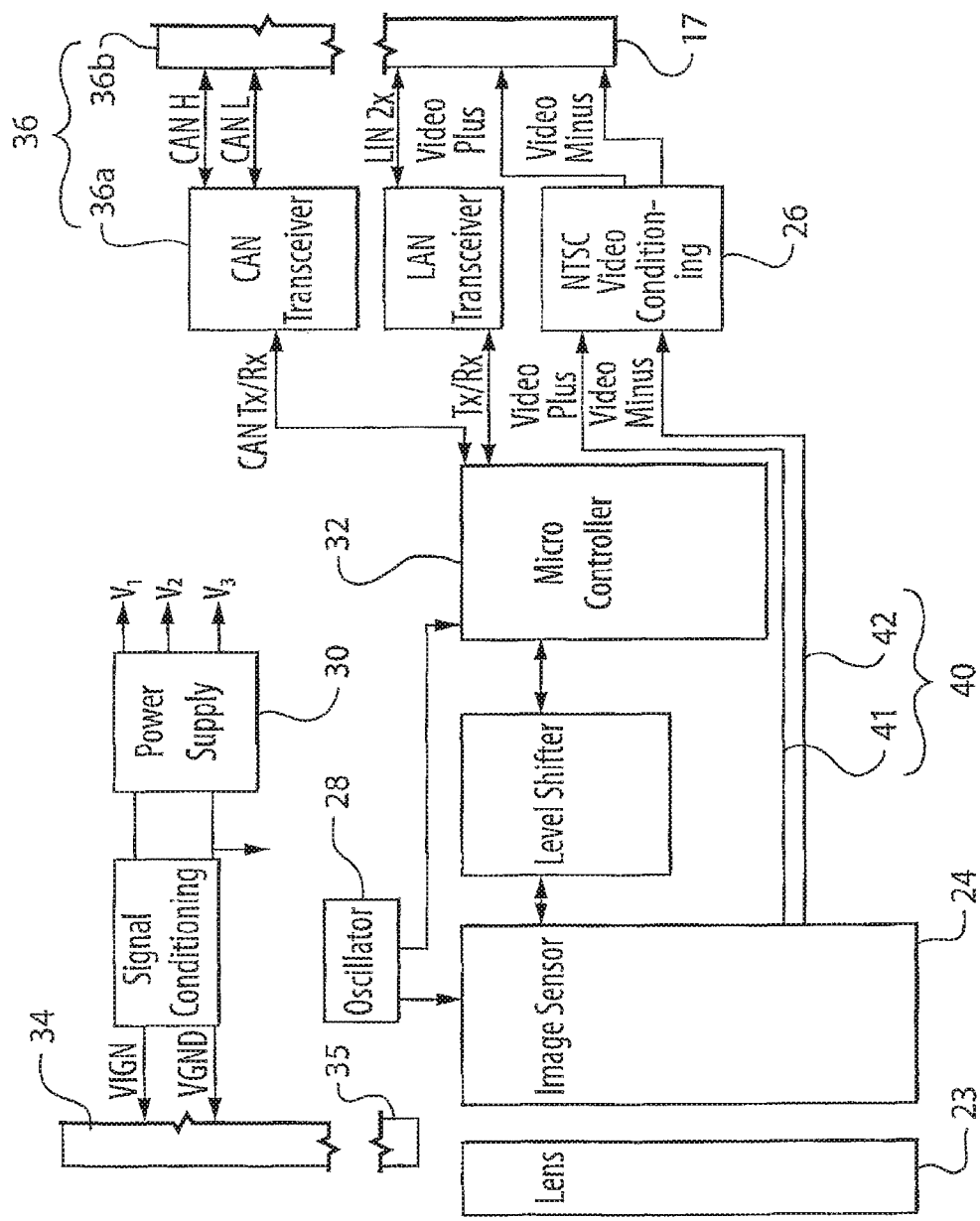
FIG. 1 is a block diagram of a camera used in one aspect of the invention.

Referring to FIG. 1, the cameras 12 used within the system 10 may each comprise a lens 23, an image sensor 24 for receiving images from the lens 23, such as a CMOS image sensor, a video conditioning element 26, an oscillator 28, a power supply 30, a microcontroller 32, a connector 34 for connecting to an electrical power source within the vehicle, a ground connector 35 for connecting to ground, a serial data interface 36 including a transceiver 36a and an associated connector 36b for communicating via serial data bus with another component, such as the camera control device 18 (FIG. 6), and the video output 17. In the embodiment shown in FIG. 1, the serial data interface 36 is a CAN interface, however the serial data interface may be any other suitable type of interface known in the art for communicating on any other suitable bus known in the art, such as for example, LIN, Flexray, MOST, or Ethernet.

When the camera control device 18 (FIG. 6) deactivates or activates the camera, it may do so by sending instructions to the microcontroller 32 through the serial data interface 36. The microcontroller 32 then controls the internal components of the camera 12 as needed to carry out the deactivation or activation.

The camera 12 communicates with the display device 14 through the video output 17. The video output 17 provides a composite video signal, which may be provided according to any suitable format, such as an NTSC standard format.

The image sensor 24 has an image sensor video output shown at 40 which is made up of a video plus electrical conduit 41 (which may be referred to as a video plus line) and a video minus electrical conduit 42 (which may be referred to as a video minus line). The image sensor video output 40 passes through the video conditioning element 26 to the camera video output 17.

Figure 2:
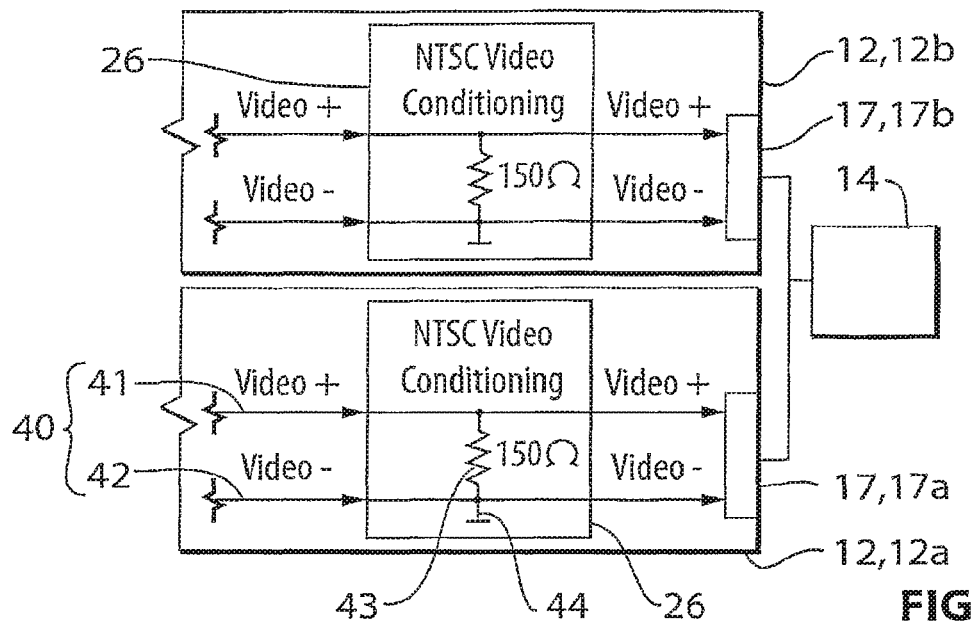
FIG. 2 is a more detailed illustration of the video conditioning block of FIG. 1 when used in a single-ended configuration.

In an embodiment shown in FIG. 2, the video conditioning element 26 comprises a 150 Ohm resistor 43 between the video plus line 41 and the video minus line 42, and a ground connection shown at 44 connected to the video minus line 42. When two cameras 12 thus equipped are arranged in parallel, as shown in FIG. 2 the cameras 12 have a parallel resistance of 75 Ohms, thereby complying with the standard impedance used in 1 Vpp NTSC composite video outputs in automotive applications.

Figure 3:
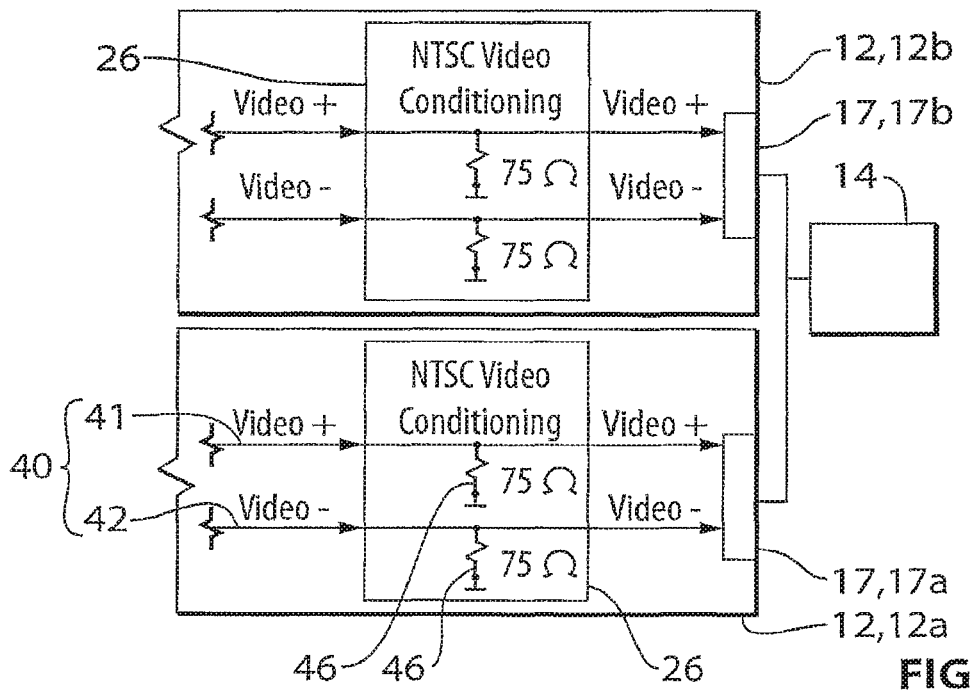
FIG. 3 is a more detailed illustration of the video conditioning block of FIG. 1 when used in a differential video configuration.

In another configuration shown in FIG. 3, the video conditioning element 26 may comprise a differential video output, wherein each output line 41 and 42 is connected through an individual 75 Ohm resistor 46 to ground, so that the resistance between the two output lines 41 and 42 is 150 Ohm. Thus, the parallel resistance of two cameras 12a and 12b in the configuration shown in FIG. 3 is 75 Ohm.

Depending on the wiring harness configuration in a particular vehicle it may be desirable to use an asymmetrical resistance distribution between two or more cameras 12 to minimize noise coupled into the video feed from the cameras 12 to the display device 14. The resistance of each parallel camera 12 may be selected as desired, while providing a parallel resistance for all cameras 12 of around 75 Ohms. In other words, the resistance in the cameras 12 need not be the same. Each camera 12 may have an individually selected resistance that may or may not be the same as the resistance in any other camera 12 in the system 10, while keeping the overall parallel resistance at or about 75 Ohms.

Figure 4:
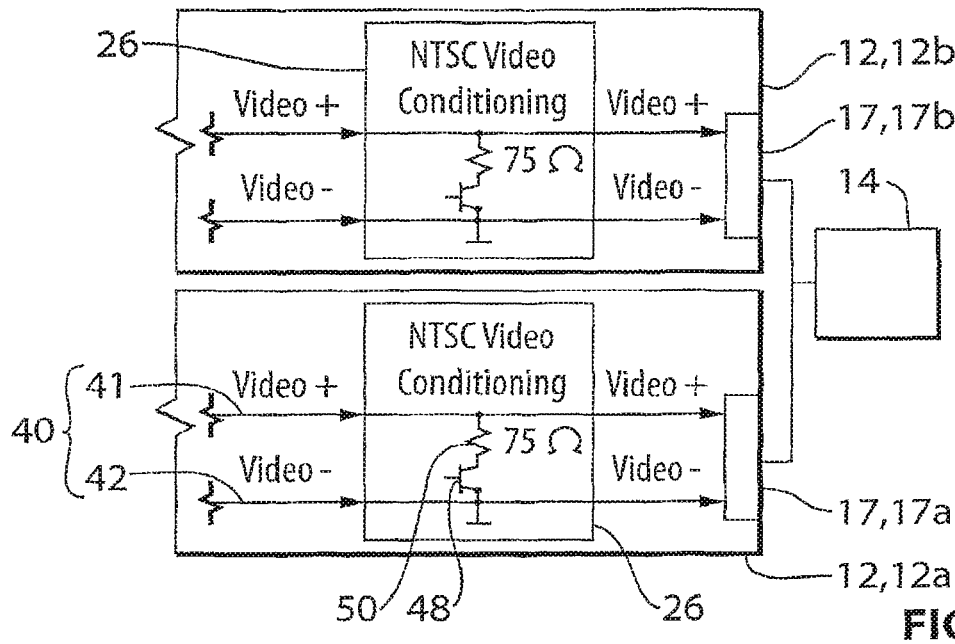
FIG. 4 is a more detailed illustration of the video conditioning block of FIG. 1 when used in a single-ended video configuration with variable resistance.

In another configuration, shown in FIG. 4, a switch 48 may be provided in series with a 75 Ohm resistor 50 between the output lines 41 and 42. When the camera control device 18 (FIG. 6) instructs a camera 12 to deactivate itself, one of the steps carried out by the microcontroller 32 is to open the switch 48, thereby switching the image sensor video output 40 into a state of very high impedance (e.g., several kilo-Ohms). When the camera control device 18 instructs a camera to activate itself, one of the steps carried out by the microcontroller 32 is to close the switch 48 so that the image sensor video output 40 has a selected operating impedance, such as, for example 75 Ohms. The cameras 12 in parallel include one camera 12 (e.g., camera 12a) that is active and that therefore has an output impedance of 75 Ohms, and a camera 12 (e.g., the camera 12b) which has an impedance of several kilo-Ohms, so that the parallel resistance of the cameras 12 to be around the 75 Ohms standard.

More specifically the camera control device 18 causes the switch 48 on one camera 12 (e.g., camera 12a), thereby activating that camera, and opens the switch 48 on the other camera 12 (e.g., camera 12b) thereby deactivating the other camera. The active camera 12a therefore has an output impedance of 75 Ohms, while the other camera 12b has a very high output impedance of several kilo-Ohms, so that the parallel resistance of the cameras 12 to be around the 75 Ohms standard. When it is desired to display video from the second camera 12b on the display device 14, the camera control device 18 opens the switch 48 on the first camera 12a and closes the switch on the second camera 12b.

Figure 5:
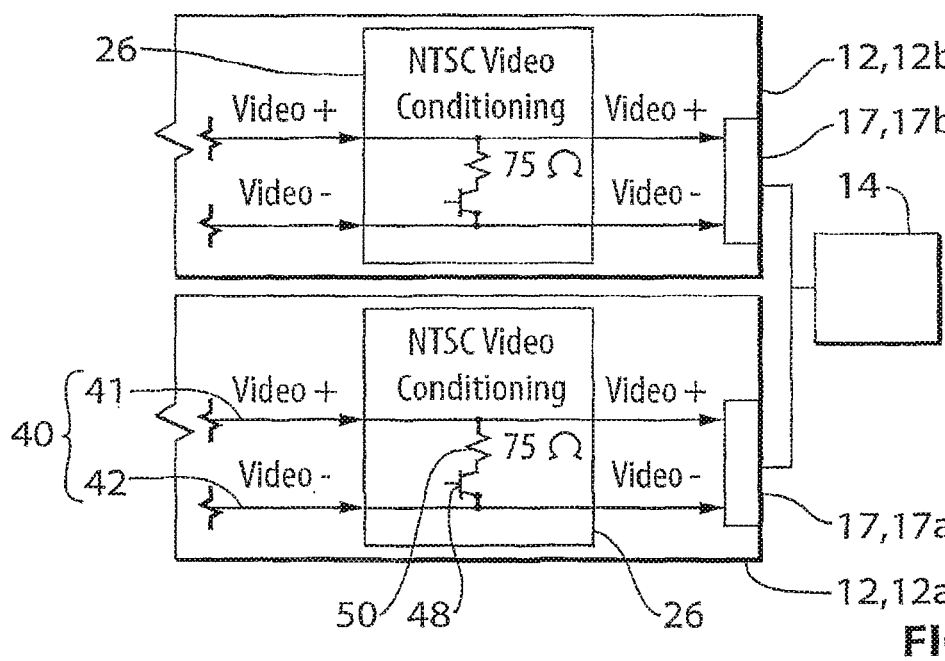
FIG. 5 is a more detailed illustration of the video conditioning block of FIG. 1 when used in a differential video configuration with variable resistance.

The configuration shown in FIG. 5 may be similar to the configuration shown in FIG. 4, except that the configuration shown in FIG. 5 provides a differential output, whereas the output in the configuration in FIG. 4 is single-ended. Thus, the configuration shown in FIG. 5 does not include a ground connection to the video minus line 42.

In the embodiments shown in FIGS. 2-6, two video sources 11 (i.e., two cameras 12) are shown as part of the system 10. It will be noted, however, that any suitable number of video sources 11 may be included in the system 10. The specific resistance used in each camera, particularly in the embodiments shown in FIGS. 2 and 3 may be selected based on the overall number of video sources 11 connected in parallel so that a selected parallel resistance (e.g., 75 Ohms) is provided.

The display device 14 may be any suitable type of display device, such as a dashboard-mounted liquid-crystal display positioned to be viewed by the vehicle driver. Optionally a touch-screen interface or any other user interface may be included on the display device 14.

Figure 7:
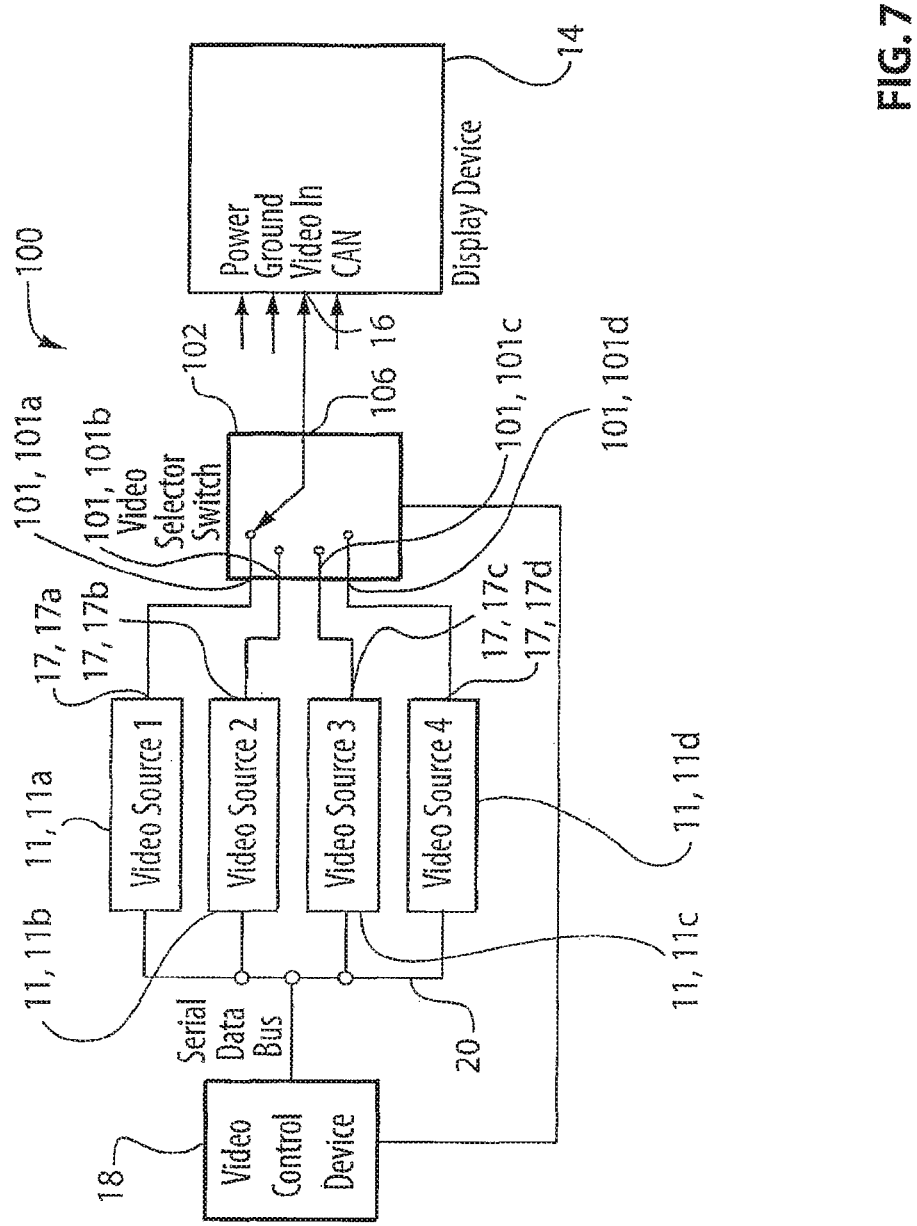
FIG. 7 is a block diagram showing an exemplary video system with four video sources, a display device and a video selector device.

Reference is made to FIG. 7, which shows a system 100 for providing and displaying video information in a vehicle, in accordance with another embodiment of the present invention. In the system 100 a plurality of video sources 11 (shown individually at 11a, 11b, 11c and 11d) are controlled by a video source control device 18 and are connected at their outputs 17a, 17b, 17c and 17d to four inputs 101 (shown individually at 101a, 101b, 101c and 101d) of a video selector switch 102 which is itself connected at its output 106 to the input 16 of the video display device 14. The video source control device 18 controls the operation of the video sources 11 through the serial data network 20 and also controls the operation of the video selector switch 54. As in the embodiments shown in FIGS. 2-6, the video source control device 18 activates one video source 11 at a time while keeping all other video sources 11 deactivated.

In an exemplary embodiment, a method used to change the active video source from video source 11a to video source 11c includes the following steps: The camera control device 18 temporarily deactivates the display device 14. The video source control device 18 deactivates the activated video source 11a. The video source control device 18 then moves the video selector switch to connect the video source 11c to the display device 14. The video source control device 18 then activates the video source 11c. The camera control device 18 reactivates the display device 14 to show the video received from the video source 11c.

It will be noted that the video source control device 18 may reactivate the display device 14 prior to activating the video source 11c. Additionally, the control device 18 may deactivate the activated video source 11a prior to deactivating the display device 14.

Because only one video source 11 is producing video at any given time the video selector switch 102 may be a simple electromechanical relay or other relatively inexpensive switching device, without requiring any precaution for preventing crosstalk between its inputs.

With respect to any of the above described embodiments, there may be some small time overlap during the deactivation of an active video source and the activation of a deactivated video source. Such a time overlap may last for several milliseconds. In such embodiments, however, the video source control device 18 is nonetheless considered to keep only one video source active at a given time and to hold all other video sources deactivated.

While the present invention has been described with reference to exemplary embodiments, it will be readily apparent to those skilled in the art that the invention is not limited to the disclosed or illustrated embodiments but, on the contrary, is intended to cover numerous other modifications, substitutions, variations and broad equivalent arrangements that are included within the spirit and scope of the following claims.

The invention claimed is:

1. A vehicular vision system, said vehicular vision system comprising:
   a plurality of cameras mounted at a vehicle equipped with said vehicular vision system;
   wherein said plurality of cameras comprises a rear-mounted camera mounted at a rear portion of the equipped vehicle;
   said rear-mounted camera comprising a CMOS image sensor;
   said rear-mounted camera viewing at least rearward of the equipped vehicle;
   wherein said plurality of cameras comprises a left side-mounted camera mounted at a driver-side portion of the equipped vehicle;
   said left side-mounted camera comprising a CMOS image sensor;
   said left side-mounted camera viewing at least sideward of a left side of the equipped vehicle;
   wherein said plurality of cameras comprises a right side-mounted camera mounted at a passenger-side portion of the equipped vehicle;
   said right side-mounted camera comprising a CMOS image sensor;
   said right side-mounted camera viewing at least sideward of a right side of the equipped vehicle;
   an image processing system for processing image data captured by said plurality of cameras;
   said rear-mounted camera comprising a serial data interface configured for transmission of image data captured by the CMOS image sensor of said rear-mounted camera to said image processing system;
   said left side-mounted camera comprising a serial data interface configured for transmission of image data captured by the CMOS image sensor of said left side-mounted camera to said image processing system;
   said right side-mounted camera comprising a serial data interface configured for transmission of image data captured by the CMOS image sensor of said right side-mounted camera to said image processing system;
   wherein image data captured by the CMOS image sensor of said rear-mounted camera is transmitted to said image processing system via a serial data bus linking said rear-mounted camera to said image processing system, and wherein image data captured by the CMOS image sensor of said rear-mounted camera transmitted to said image processing system is processed at said image processing system;
   wherein image data captured by the CMOS image sensor of said left side-mounted camera is transmitted to said image processing system via a serial data bus linking said left side-mounted camera to said image processing system, and wherein image data captured by the CMOS image sensor of said left side-mounted camera transmitted to said image processing system is processed at said image processing system;
   wherein image data captured by the CMOS image sensor of said right side-mounted camera is transmitted to said image processing system via a serial data bus linking said right side-mounted camera to said image processing system, and wherein image data captured by the CMOS image sensor of said right side-mounted camera transmitted to said image processing system is processed at said image processing system;
   wherein said vehicular vision system transmits data to said rear-mounted camera of the equipped vehicle via said serial data bus linking said rear-mounted camera to said image processing system;
   wherein said vehicular vision system transmits data to said left side-mounted camera of the equipped vehicle via said serial data bus linking said left side-mounted camera to said image processing system;
   wherein said vehicular vision system transmits data to said right side-mounted camera of the equipped vehicle via said serial data bus linking said right side-mounted camera to said image processing system; and
   wherein said vehicular vision system activates at least one camera of said plurality of cameras responsive to a gear position of the equipped vehicle.

2. The vehicular vision system of claim 1, wherein said serial data bus linking said rear-mounted camera to said image processing system comprises an Ethernet bus, and wherein said serial data bus linking said left side-mounted camera to said image processing system comprises an Ethernet bus, and wherein said serial data bus linking said right side-mounted camera to said image processing system comprises an Ethernet bus.

3. The vehicular vision system of claim 1, wherein video images derived at least in part from image data captured by the activated at least one camera of said plurality of cameras are displayed at a video display screen of the equipped vehicle for viewing by a driver of the equipped vehicle.

4. The vehicular vision system of claim 1, wherein said vehicular vision system activates the at least one camera of said plurality of cameras via data transmitted via said serial data bus linking the at least one camera to said image processing system.

5. The vehicular vision system of claim 4, wherein the activated at least one camera of said plurality of cameras comprises said rear-mounted camera.

6. The vehicular vision system of claim 5, wherein said vehicular vision system activates the rear-mounted camera responsive to the gear position of the equipped vehicle being in a reverse gear.

7. The vehicular vision system of claim 4, wherein said vehicular vision system deactivates the at least one camera of said plurality of cameras via data transmitted via said serial data bus linking the at least one camera to said image processing system.

8. The vehicular vision system of claim 7, wherein the at least one camera of said plurality of cameras comprises the rear-mounted camera.

9. The vehicular vision system of claim 1, wherein said vehicular vision system activates at least one camera of said plurality of cameras responsive to at least one selected from the group consisting of (i) a steering angle of the equipped vehicle and (iii) data received from a navigation system of the equipped vehicle.

10. The vehicular vision system of claim 1, wherein said image processing system comprises a CAN interface.

11. A vehicular vision system, said vehicular vision system comprising:

a plurality of cameras mounted at a vehicle equipped with said vehicular vision system;

wherein said plurality of cameras comprises a rear-mounted camera mounted at a rear portion of the equipped vehicle;

said rear-mounted camera comprising a CMOS image sensor;

said rear-mounted camera viewing at least rearward of the equipped vehicle;

wherein said plurality of cameras comprises a left side-mounted camera mounted at a driver-side portion of the equipped vehicle;

said left side-mounted camera comprising a CMOS image sensor;

said left side-mounted camera viewing at least sideward of a left side of the equipped vehicle;

wherein said plurality of cameras comprises a right side-mounted camera mounted at a passenger-side portion of the equipped vehicle;

said right side-mounted camera comprising a CMOS image sensor;

said right side-mounted camera viewing at least sideward of a right side of the equipped vehicle;

an image processing system for processing image data captured by said plurality of cameras;

said rear-mounted camera comprising a serial data interface configured for transmission of image data captured by the CMOS image sensor of said rear-mounted camera to said image processing system;

said left side-mounted camera comprising a serial data interface configured for transmission of image data captured by the CMOS image sensor of said left side-mounted camera to said image processing system;

said right side-mounted camera comprising a serial data interface configured for transmission of image data captured by the CMOS image sensor of said right side-mounted camera to said image processing system;

wherein image data captured by the CMOS image sensor of said rear-mounted camera is transmitted to said image processing system via a serial data bus linking said rear-mounted camera to said image processing system, and wherein image data captured by the CMOS image sensor of said rear-mounted camera transmitted to said image processing system is processed at said image processing system;

wherein image data captured by the CMOS image sensor of said left side-mounted camera is transmitted to said image processing system via a serial data bus linking said left side-mounted camera to said image processing system, and wherein image data captured by the CMOS image sensor of said left side-mounted camera transmitted to said image processing system is processed at said image processing system;

wherein image data captured by the CMOS image sensor of said right side-mounted camera is transmitted to said image processing system via a serial data bus linking said right side-mounted camera to said image processing system, and wherein image data captured by the CMOS image sensor of said right side-mounted camera transmitted to said image processing system is processed at said image processing system;

wherein said vehicular vision system transmits data to said rear-mounted camera of the equipped vehicle via said serial data bus linking said rear-mounted camera to said image processing system;

wherein said vehicular vision system transmits data to said left side-mounted camera of the equipped vehicle via said serial data bus linking said left side-mounted camera to said image processing system;

wherein said vehicular vision system transmits data to said right side-mounted camera of the equipped vehicle via said serial data bus linking said right side-mounted camera to said image processing system; and wherein said vehicular vision system activates at least one camera of said plurality of cameras based on situational analysis information derived from the image processing system of the equipped vehicle.

12. The vehicular vision system of claim 11, wherein said serial data bus linking said rear-mounted camera to said image processing system comprises an Ethernet bus, and wherein said serial data bus linking said left side-mounted camera to said image processing system comprises an Ethernet bus, and wherein said serial data bus linking said right side-mounted camera to said image processing system comprises an Ethernet bus.

13. The vehicular vision system of claim 11, wherein video images derived at least in part from image data captured by the activated at least one camera of said plurality of cameras are displayed at a video display screen of the equipped vehicle for viewing by a driver of the equipped vehicle.

14. The vehicular vision system of claim 11, wherein said vehicular vision system activates the at least one camera of said plurality of cameras via data transmitted via said serial data bus linking the at least one camera to said image processing system.

15. The vehicular vision system of claim 14, wherein said vehicular vision system deactivates the at least one camera of said plurality of cameras via data transmitted via said serial data bus linking the at least one camera to said image processing system.

16. The vehicular vision system of claim 11, wherein said vehicular vision system activates at least one camera of said plurality of cameras based on a radar sensor system of the equipped vehicle.

17. The vehicular vision system of claim 11, wherein said image processing system comprises a CAN interface.

18. A vehicular vision system, said vehicular vision system comprising:

a plurality of cameras mounted at a vehicle equipped with said vehicular vision system;

wherein said plurality of cameras comprises a rear-mounted camera mounted at a rear portion of the equipped vehicle;

said rear-mounted camera comprising a CMOS image sensor;

said rear-mounted camera viewing at least rearward of the equipped vehicle;

wherein said plurality of cameras comprises a left side-mounted camera mounted at a driver-side portion of the equipped vehicle;

said left side-mounted camera comprising a CMOS image sensor;

said left side-mounted camera viewing at least sideward of a left side of the equipped vehicle;

wherein said plurality of cameras comprises a right side-mounted camera mounted at a passenger-side portion of the equipped vehicle;
said right side-mounted camera comprising a CMOS image sensor;
said right side-mounted camera viewing at least sideward of a right side of the equipped vehicle;
an image processing system for processing image data captured by said plurality of cameras;
said rear-mounted camera comprising a serial data interface configured for transmission of image data captured by the CMOS image sensor of said rear-mounted camera to said image processing system;
said left side-mounted camera comprising a serial data interface configured for transmission of image data captured by the CMOS image sensor of said left side-mounted camera to said image processing system;
said right side-mounted camera comprising a serial data interface configured for transmission of image data captured by the CMOS image sensor of said right side-mounted camera to said image processing system;
wherein image data captured by the CMOS image sensor of said rear-mounted camera is transmitted to said image processing system via a serial data bus linking said rear-mounted camera to said image processing system, and wherein image data captured by the CMOS image sensor of said rear-mounted camera transmitted to said image processing system is processed at said image processing system;
wherein image data captured by the CMOS image sensor of said left side-mounted camera is transmitted to said image processing system via a serial data bus linking said left side-mounted camera to said image processing system, and wherein image data captured by the CMOS image sensor of said left side-mounted camera transmitted to said image processing system is processed at said image processing system;
wherein image data captured by the CMOS image sensor of said right side-mounted camera is transmitted to said image processing system via a serial data bus linking said right side-mounted camera to said image processing system, and wherein image data captured by the CMOS image sensor of said right side-mounted camera transmitted to said image processing system is processed at said image processing system;
wherein said vehicular vision system transmits data to said rear-mounted camera of the equipped vehicle via said serial data bus linking said rear-mounted camera to said image processing system;
wherein said vehicular vision system transmits data to said left side-mounted camera of the equipped vehicle via said serial data bus linking said left side-mounted camera to said image processing system;
wherein said vehicular vision system transmits data to said right side-mounted camera of the equipped vehicle via said serial data bus linking said right side-mounted camera to said image processing system; and
wherein said vehicular vision system activates at least one camera of said plurality of cameras based on a driving condition.

19. The vehicular vision system of claim 18, wherein said serial data bus linking said rear-mounted camera to said image processing system comprises an Ethernet bus, and wherein said serial data bus linking said left side-mounted camera to said image processing system comprises an Ethernet bus, and wherein said serial data bus linking said right side-mounted camera to said image processing system comprises an Ethernet bus.

20. The vehicular vision system of claim 18, wherein video images derived at least in part from image data captured by the activated at least one camera of said plurality of cameras are displayed at a video display screen of the equipped vehicle for viewing by a driver of the equipped vehicle.

21. The vehicular vision system of claim 18, wherein said vehicular vision system activates the at least one camera of said plurality of cameras via data transmitted via said serial data bus linking the at least one camera to said image processing system.

22. The vehicular vision system of claim 21, wherein said vehicular vision system deactivates the at least one camera of said plurality of cameras via data transmitted via said serial data bus linking the at least one camera to said image processing system.

23. The vehicular vision system of claim 18, wherein the driving condition comprises parking the equipped vehicle.

24. The vehicular vision system of claim 18, wherein the driving condition comprises reversing the equipped vehicle.

25. The vehicular vision system of claim 18, wherein said image processing system comprises a CAN interface.

* * * * *